Patented Feb. 20, 1923.

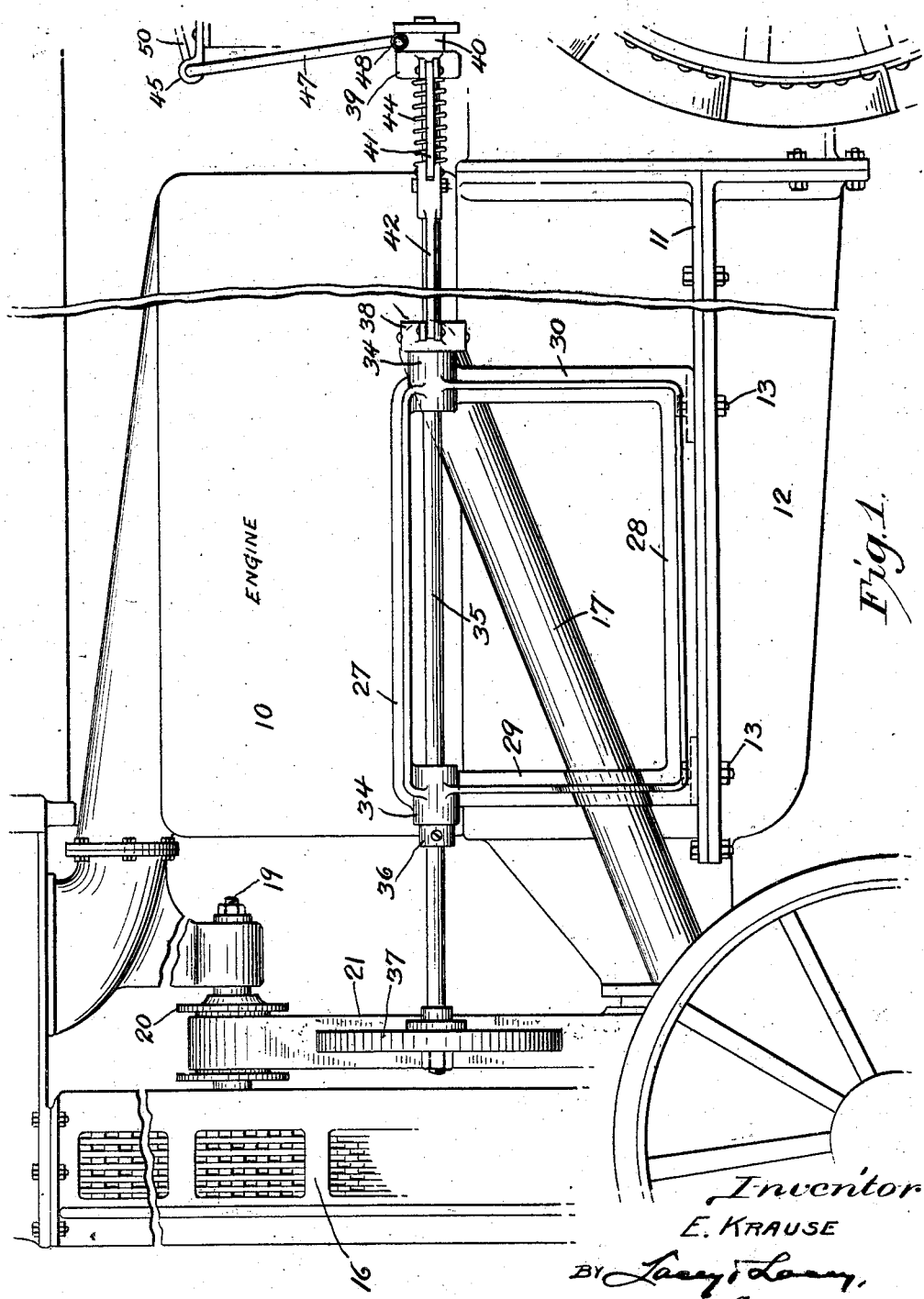

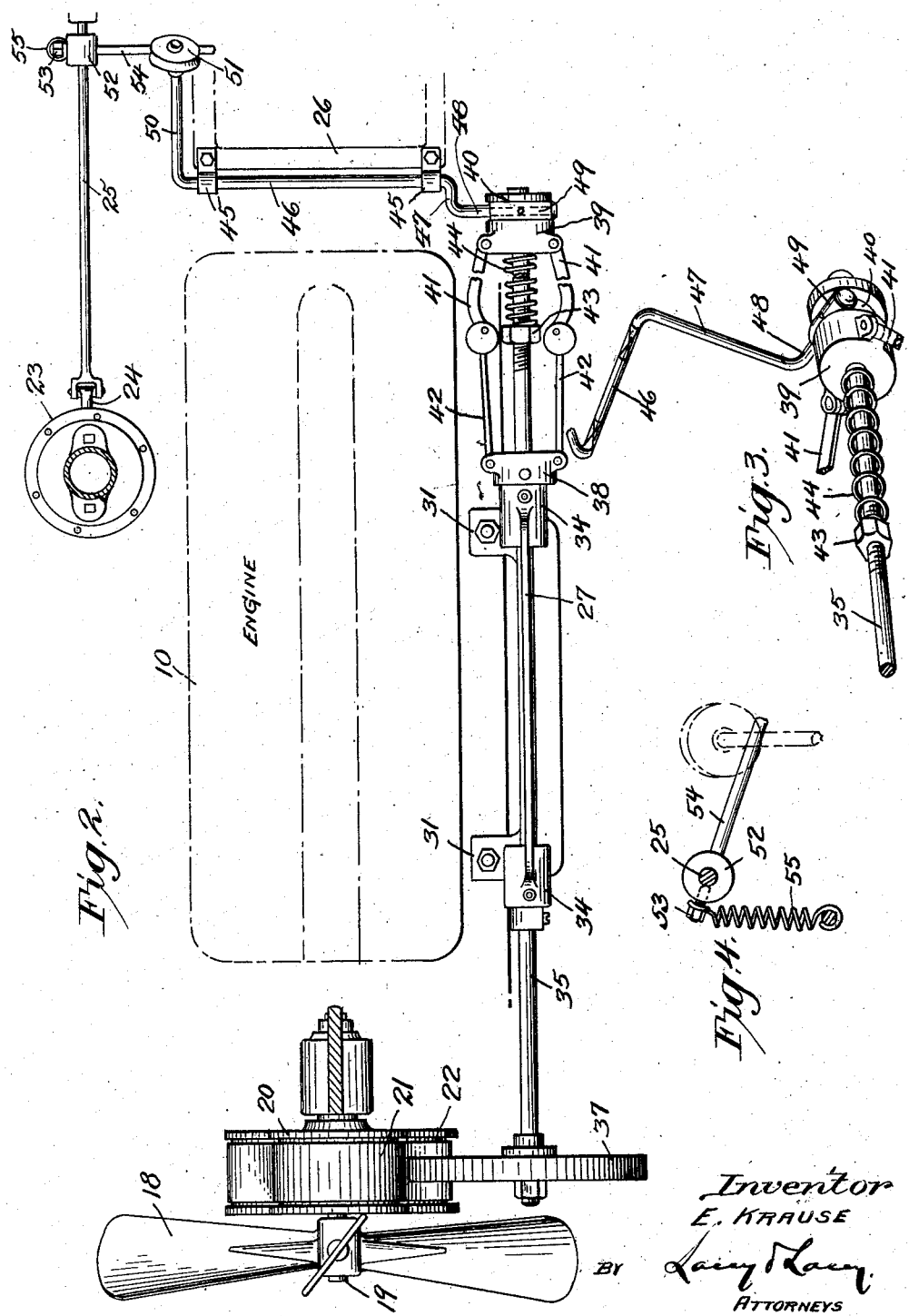

1,446,051

UNITED STATES PATENT OFFICE.

EDWARD KRAUSE, OF COLFAX, WISCONSIN.

SPEED GOVERNOR FOR TRACTORS.

Application filed April 2, 1919. Serial No. 286,858.

*To all whom it may concern:*

Be it known that I, EDWARD KRAUSE, a citizen of the United States, residing at Colfax, in the county of Dunn and State of Wisconsin, have invented certain new and useful Improvements in Speed Governors for Tractors, of which the following is a specification.

This invention relates to an improved governor for tractors and more particularly to the Ford type of tractor and has as its primary object to provide an arrangement wherein the speed of the tractor may be automatically controlled.

In the Ford type of tractor all of the mechanism of the engine and associated parts is, with the exception of the fan, the fan belt and drive pulley for the belt, enclosed, and the invention, therefore, has as a further object to provide a governor which may be operated from the fan belt so as to thereby eliminate any necessity for structural change in the tractor.

The invention has as a still further object to provide a governor which may be adjustably set for different tractor speeds.

And the invention has as a still further object to provide a governor which may be easily and quickly mounted in position and which, in practical use, will operate with entire efficiency.

Other and incidental objects will appear hereinafter. In the drawings:

Figure 1 is a fragmentary side elevation showing my improved governor in active position upon a tractor of the Ford type, Figure 2 is a fragmentary plan view more particularly illustrating the disposition of the governor with respect to the tractor engine and associated parts, Figure 3 is a fragmentary perspective view showing the manner in which the throttle actuating lever employed is engaged with the slide yoke of the governor, and Figure 4 is a detail view showing the arm which is carried by the throttle rod and the spring associated with said arm for opening the throttle.

In order that the construction, operation and mounting of my improved governor may be accurately understood I have, in the drawings, shown the governor in connection with a Ford type of tractor. However, while the governor is particularly designed for use in connection with this type of tractor still, I do not wish to be limited in this regard since the governor may be found entirely effective in use upon other types of tractors. For present purposes the governor will, nevertheless, be described in detail in connection with the Ford type of tractor shown. The engine of the tractor is indicated at 10. The base of this engine is formed with a flange 11 which mates with a similar flange of the crank case 12 of the engine. Connecting these flanges is a plurality of bolts or other suitable fastenings, two of which have, for convenience, been indicated at 13. The engine radiator is indicated at 16 and a return pipe 17 leads from the bottom portion of this radiator to the water jacket of the engine cylinders. Supported in the rear of the radiator is the cooling fan 18 therefor, this fan being mounted upon a shaft 19 to which is fixed a pulley 20. Trained over this pulley is the drive belt 21 for the fan which belt is also trained over a pulley 22 on the front end of the engine crank shaft in the usual manner so that the fan will thus be driven from the shaft. The carbureter for the engine is indicated at 23. Projecting from the carbureter is the stem 24 of the butterfly throttle valve of the carbureter and connected with this stem is a throttle rod 25 rotatable for opening and closing the valve.

Coming now more particularly to the subject of the present invention, I employ an oblong supporting frame which includes upper and lower side bars 27 and 28 respectively which are connected by end bars 29 and 30. Projecting laterally and inwardly from the lower side bar are lugs 31, best shown in Figure 2. These lugs rest upon the flange 11 of the engine base at the adjacent side of the engine and receive the bolts 13 which serve to rigidly secure the frame in position upstanding from said flange. In this connection it is to be observed that the end bar 29 of the frame is, adjacent its lower end, formed with a bowed portion to extend around the return pipe 17 of the engine.

Formed on the end bars 29 and 30 of the frame at their upper ends, are alined bearings 34 and journaled through said bearings is a governor shaft 35. A collar 36 fixed to the shaft coacts with the foremost bearing for holding the shaft against rearward longitudinal movement and fixed upon the forward end of the shaft is a pulley 37 coacting with the fan drive belt 21. Fixed upon the shaft is a collar 38 coacting with the rearmost bearing of the supporting frame for holding the shaft against forward longitudinal movement and slidable longitudinally upon the rear end portion of the shaft is a yoke 39. This yoke is provided with an annular groove 40 and pivoted upon the yoke at opposite sides thereof are links 41 coupled with weighted arms 42 pivotally mounted upon the collar 38 at opposite sides thereof. Threaded upon the rear end portion of the governor shaft in advance of the yoke 39 is a nut 43 and bearing between this nut and the yoke is a helical spring 44 surrounding the shaft.

Fixed upon a convenient support 26 in rear of the engine are spaced looped bearing straps 45 and journaled through these straps is the horizontal portion of a throttle actuating lever 46. At one end of this horizontal portion of the lever is a depending crank 47 from the lower end of which projects a laterally and outwardly directed arm 48 and mounted upon this arm is a sleeve roller 49 engaging in the groove 40 of the governor yoke 39. At the opposite end of the horizontal portion of the lever 46 is a rearwardly directed crank 50 upon the outer end of which is rotatably mounted a grooved roller 51. In the normal position of the governor yoke 39 upon the governor shaft, this crank 50 is inclined rearwardly upward towards its free end. Adjustably rotatable upon the throttle rod 25 is a sleeve 52 held in adjusted position upon the rod by a set bolt 53. Projecting inwardly from the sleeve is an arm 54 and bearing over this arm is the roller 51 of the crank 50 of the throttle actuating lever 46. Connected at one end with the set bolt 53 is a spring 55, the opposite end of which is, as shown in Figure 4, secured to any conveniently located part of the tractor. This spring is adapted to rotate the throttle rod 25 and normally tends to open the throttle valve of the carbureter 23.

As will now be seen, the spring 44 upon the shaft 35 of the governor will normally hold the yoke 39 at the limit of its outward movement upon the shaft. Consequently, the crank 47 of the lever 46 will be swung rearwardly to its extreme position so that the crank 50 will be held elevated, allowing the spring 54 to maintain the throttle valve of the carbureter open. However, when the engine is started and the fan belt 21 is caused to travel accordingly, the governor shaft 35 will, through the frictional engagement of the pulley 37 with said belt, be caused to rotate. The links 41 of the governor will, therefore, as will be clear, be swung outwardly so that the yoke 39 will be shifted forwardly upon the governor shaft against the tension of the spring 44. Forward movement of the yoke 39 will, in turn, swing the crank 47 forward to depress the pulley 51 against the arm 54 and accordingly rotate the throttle rod 25 for closing the throttle valve of the carbureter. Therefore, as will be seen, the maximum speed of the tractor will be governed by the tension of the spring 44, the extent of forward movement of the yoke 39 compressing this spring determining the extent of the closing movement of the throttle valve of the carbureter. Consequently, by positioning the nut 43 longitudinally upon the governor shaft to accordingly vary the tension of the spring 44, the governor may be readily set for different tractor speeds. Furthermore, since the governor is driven directly from the fan belt which, in turn, is driven by the engine crank shaft, the governor will tend to maintain the speed of the tractor constant at any given speed to which the governor is adjusted. I accordingly provide a highly effective type of governor and, as will now be appreciated, a governor which may be readily connected to a tractor of the Ford type without the necessity for structural change therein.

Having thus described the invention, what is claimed as new is:

1. The combination with an engine, a radiator, and a return pipe leading from the radiator to the water jacket of the engine, of a frame consisting of a bottom bar secured upon the engine, a top bar and end bars connecting the top and bottom bars, one of said end bars having a bowed portion accommodating the return pipe, a governor shaft journaled in said frame and arranged parallel to the side of the engine, means whereby said shaft is driven from the engine, a fuel control, a governor on the governor shaft, and operative connections in rear of the engine between the governor and the fuel control whereby to decrease the flow of fuel as the speed of the engine increases.

2. The combination with an internal combustion engine, and a carburetor therefor, of a governor shaft supported longitudinally at one side of the engine, means whereby said governor shaft may be driven from the engine, a governor carried by the rear end of said governor shaft and including a slidable yoke, a rock shaft mounted in rear of the engine transversely thereto, an arm at one end of said rock shaft engaging said slidable yoke, a crank at the opposite end of said rock shaft, a carburetor-controlling rod, an arm extending from said rod and engaging the last-mentioned crank, and a spring connected to said rod and acting thereon to hold the carburetor normally open and the said arm in engagement with the said crank.

3. The combination with an internal combustion engine, and a carburetor therefor, of a governor shaft supported longitudinally at one side of the engine, means whereby said governor shaft may be driven from the engine, a governor carried by the rear end of said governor shaft and including a slidable yoke having an exterior annular groove, a rock shaft mounted in rear of the engine transversely thereto, an arm at one end of said rock shaft engaging in the groove in the said sliding yoke, a crank at the opposite end of said rock shaft, a grooved roller at the free end of said crank, a carburetor controlling rod, a sleeve secured on said rod, an arm extending from said sleeve and engaging said grooved roller, and a spring connected to said sleeve and acting thereon to hold the carburetor normally open and the said arm in engagement with said grooved roller.

In testimony whereof I affix my signature.

EDWARD KRAUSE. [L. S.]